D. F. Dietrich,

Vegetable Cutter.

No. 96,679. Patented Nov. 9, 1869.

Witnesses
C. L. Evert
Harry King

Inventor
Daniel F. Dietrich
by Alexander Mason
att'ys

United States Patent Office.

DANIEL F. DIETRICH, OF NOBLESVILLE, INDIANA.

Letters Patent No. 96,679, dated November 9, 1869.

IMPROVED SLAW OR CABBAGE-CUTTER.

The Schedule referred to in these Letters Patent and making part of the same.

*To all whom it may concern:*

Be it known that I, DANIEL F. DIETRICH, of Noblesville, in the county of Hamilton, and in the State of Indiana, have invented certain new and useful Improvements in Slaw or Cabbage-Cutters; and I do hereby declare that the following is a full, clear, and exact description thereof, reference being had to the accompanying drawings, and to the letters of reference marked thereon, making a part of this specification.

The nature of my invention consists in the construction and general arrangement of a slaw or cabbage-cutter, as will be hereinafter fully set forth.

In order to enable others skilled in the art to which my invention appertains, to make and use the same, I will now proceed to describe its construction and operation, referring to the annexed drawings, in which—

Figure 1:
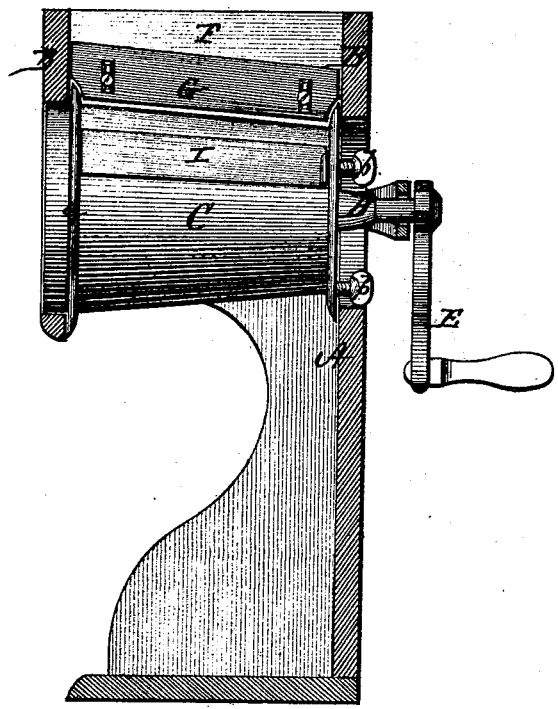
Figure 1 is a side elevation.
Figure 2:
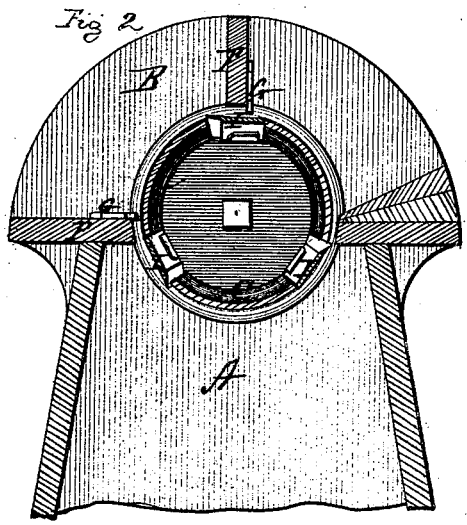
Figure 2 is a vertical section of my machine.

A represents the frame of the machine, having on its upper side a hopper, B.

In this frame is placed the revolving hollow frustum of a cone or a cylinder, C, which is open at the base, or one end, and closed at the other end.

The cylinder or cone C is, at its closed end, or apex, provided with a gudgeon, D, to which the crank E is attached, and it is, at the base, or open end, encircled by a band or collar, a, which holds it securely in its position.

The cylinder or cone C is provided with a series of longitudinal slots, of any desired width, and at equal distances apart, in which slots the adjustable knives L L are pivoted, said knives or cutters being held in any position desired by means of the thumb-screws $b$ $b$, at the closed end of the cylinder.

The cross-pieces F F of the hopper B are made solid with the end-pieces, and are supplied with gauges, G G, to correspond with the depth of the cut, as regulated by the adjustable knives I I, on the cone or cylinder.

The cabbage or vegetables to be cut are placed in the hopper, and held with one hand, while the cone or cylinder is turned with the other, by the crank.

By this simple arrangement, cabbage and other vegetables can be cut more neatly and evenly, and with much greater facility, than in the ordinary way, and a great amount of labor will thus be saved.

Having thus fully described my invention,

What I claim as new, and desire to secure by Letters Patent, is—

The combination and arrangement of the frame A with hopper B, cylinder C, gudgeon D, crank E, adjustable knives I I, screws $b$ $b$, and gauges G G, all constructed and operating in the manner and for the purposes herein set forth.

In testimony that I claim the foregoing, I have hereunto set my hand, this 11th day of September, 1869.

DANIEL F. DIETRICH.

Witnesses:
   E. M. MORRISON,
   F. M. TRISSAL.